(12) United States Patent
Chae et al.

(10) Patent No.: US 11,974,224 B2
(45) Date of Patent: Apr. 30, 2024

(54) METHOD AND APPARATUS FOR RECEIVING WAKE-UP SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/565,672

(22) Filed: Dec. 30, 2021

(65) Prior Publication Data

US 2022/0124618 A1    Apr. 21, 2022

Related U.S. Application Data

(63) Continuation of application No. 16/608,432, filed as application No. PCT/KR2018/004862 on Apr. 26, 2018, now Pat. No. 11,218,964.

(60) Provisional application No. 62/502,612, filed on May 6, 2017, provisional application No. 62/490,039, filed on Apr. 26, 2017.

(51) Int. Cl.
*H04W 52/02* (2009.01)
*H04W 4/40* (2018.01)
(Continued)

(52) U.S. Cl.
CPC ......... *H04W 52/0229* (2013.01); *H04W 4/40* (2018.02); *H04W 8/005* (2013.01);
(Continued)

(58) Field of Classification Search
CPC ... H04W 52/0229; H04W 4/40; H04W 8/005; H04W 56/001; H04W 72/0446; H04W 76/28
See application file for complete search history.

(56) References Cited

U.S. PATENT DOCUMENTS

| 2014/0003312 A1 | 1/2014 | Sergeyev | H04W 72/005 370/311 |
| 2015/0189574 A1 | 7/2015 | Ng | H04W 24/08 370/252 |

(Continued)

FOREIGN PATENT DOCUMENTS

WO    2017052596 A1    3/2017

OTHER PUBLICATIONS

M. Park et al., "LP-WUR (Low-Power Wake-Up Receiver) Follow-UP", IEEE 802.11-16/0341r0, Mar. 14, 2016.
(Continued)

*Primary Examiner* — Donald L Mills
(74) *Attorney, Agent, or Firm* — BRYAN CAVE LEIGHTON PAISNER LLP

(57) ABSTRACT

One embodiment of the present invention provides a method for receiving a wake-up signal by a first UE in a wireless communication system, the method comprising the steps of: operating a wake-up receiver during a wake-up signal on-duration by the first UE; and receiving a wake-up signal transmitted by a second UE through the wake-up receiver and then receiving data, wherein information related to the wake-up signal on-duration is commonly signaled to the first UE, which receives the wake-up signal, and the second UE which transmits the wake-up signal. The UE is capable of communicating with at least one of another UE, a UE related to an autonomous driving vehicle, the BS or a network.

9 Claims, 12 Drawing Sheets

(51) Int. Cl.
    *H04W 8/00*         (2009.01)
    *H04W 56/00*       (2009.01)
    *H04W 72/0446*    (2023.01)
    *H04W 76/28*       (2018.01)

(52) U.S. Cl.
    CPC ..... *H04W 56/001* (2013.01); *H04W 72/0446* (2013.01); *H04W 76/28* (2018.02)

(56) References Cited

U.S. PATENT DOCUMENTS

| | | |
|---|---|---|
| 2015/0282076 A1 | 10/2015 | Larmo et al. |
| 2016/0127995 A1* | 5/2016 | Merlin .............. H04W 52/0229 370/311 |
| 2016/0242115 A1 | 8/2016 | Jafarian et al. |
| 2016/0323824 A1* | 11/2016 | Xhafa ................. H04W 56/001 |
| 2017/0325167 A1 | 11/2017 | Lu ..................... H04W 52/0229 |
| 2018/0234919 A1 | 8/2018 | Tsuda ................ H04W 52/0216 |
| 2018/0270756 A1* | 9/2018 | Bhattad ............. H04W 52/0216 |
| 2020/0092807 A1* | 3/2020 | Li ......................... H04W 52/02 |
| 2022/0201649 A1* | 6/2022 | Cox .................. H04W 52/0235 |

OTHER PUBLICATIONS

J. Son et al., "Wake-up and Data Exchange Sequences", IEEE 802.11-16/1470r0, Nov. 8, 2016.

\* cited by examiner

FIG. 5
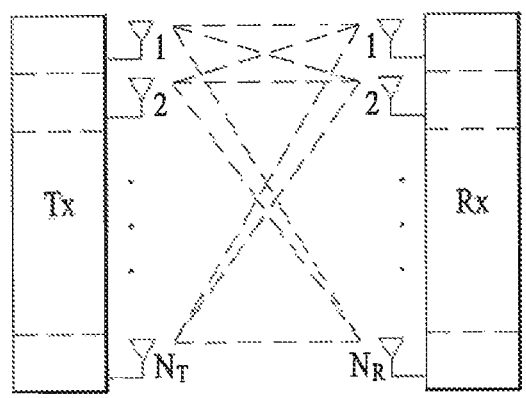
(a)
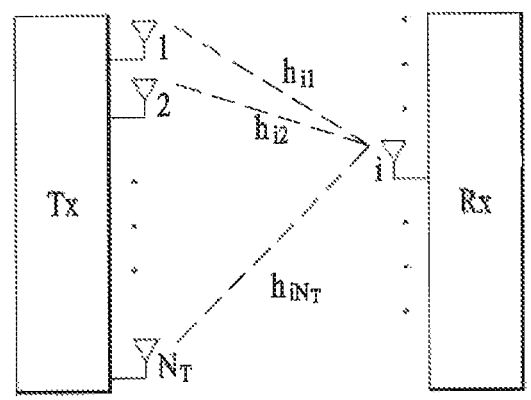
(b)

FIG. 8
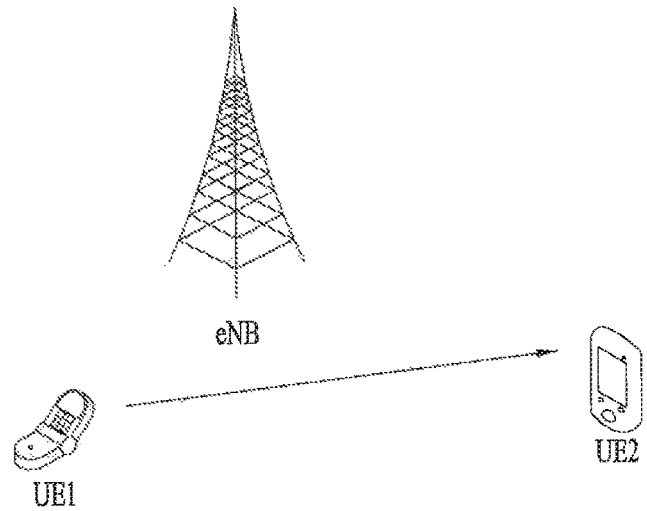
(a)
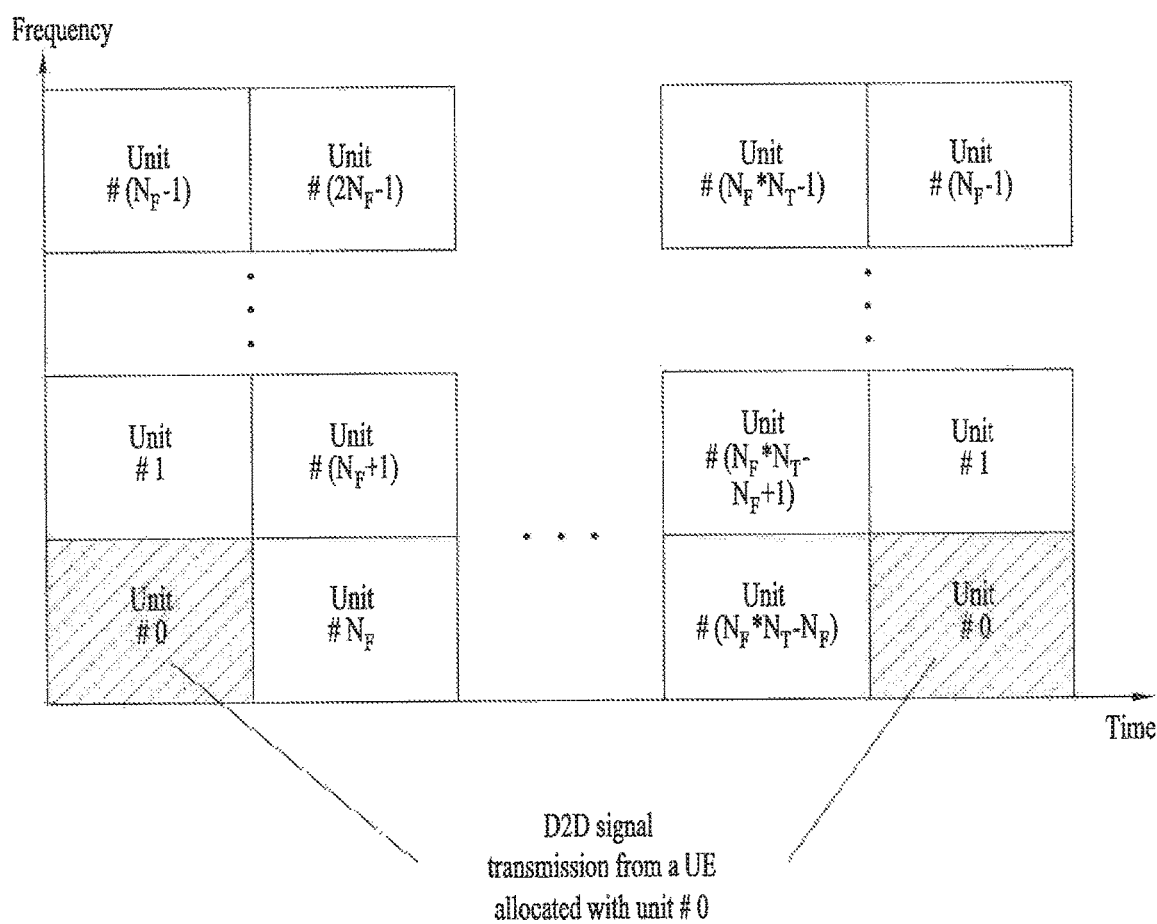
(b)

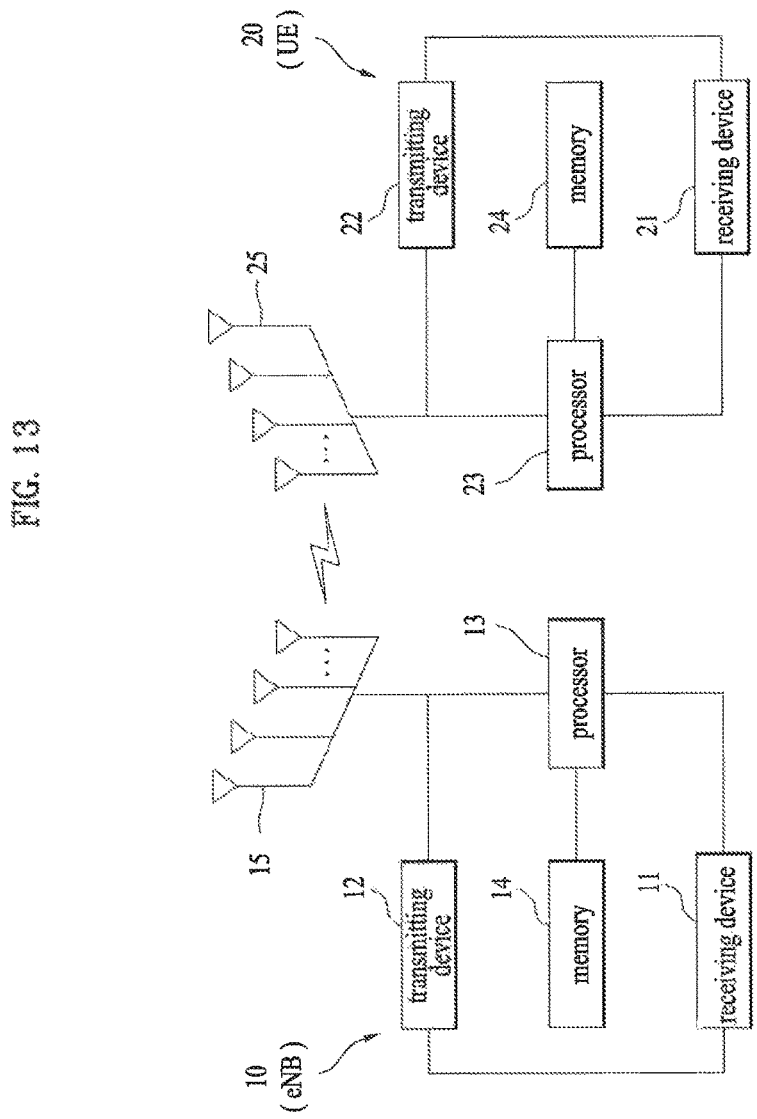

METHOD AND APPARATUS FOR RECEIVING WAKE-UP SIGNAL IN WIRELESS COMMUNICATION SYSTEM

This application is a continuation of U.S. patent application Ser. No. 16/608,432, filed Oct. 25, 2019, which is the National Stage filing of International Application No. PCT/KR2018/004862 filed Apr. 26, 2018, which claims priority to U.S. Provisional Application No. 62/490,039, filed on Apr. 26, 2017, and U.S. Provisional Application No. 62/502,612, filed on May 6, 2017 all of which are incorporated by reference in their entirety herein.

TECHNICAL FIELD

The present disclosure relates to a wireless communication system, and more particularly, to a method and apparatus for transmitting and receiving a wake-up signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide how to operate a wake-up signal in D2D or V2X communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of receiving a wake-up signal by a first user equipment (UE) in a wireless communication system. The method may include operating, by the first UE, a wake-up receiver during wake-up signal ON duration and receiving data after receiving a wake-up signal transmitted from a second UE through the wake-up receiver. The information related to the wake-up signal ON duration may be signaled to both the first UE receiving the wake-up signal and the second UE transmitting the wake-up signal.

In another aspect of the present disclosure, provided is a first UE for receiving a wake-up signal in a wireless communication system. The first UE may include a transmitter, a receiver, and a processor. The processor may be configured to operate a wake-up receiver during wake-up signal ON duration and receive data after receiving a wake-up signal transmitted from a second UE through the wake-up receiver. Information related to the wake-up signal ON duration may be signaled to both the first UE receiving the wake-up signal and the second UE transmitting the wake-up signal.

The information related to the wake-up signal ON duration may include at least one of a period, an ON duration length, a subframe offset, and a frequency resource location.

The wake-up signal ON duration may overlap with ON duration of a discontinuous reception (DRX) cycle.

The first UE may correspond to a pedestrian UE (P-UE), and the second UE may correspond to one of a vehicle UE (V-UE), a road side unit (RSU), and an evolved node B (eNB).

The wake-up signal may be for a discovery signal.

When a discovery resource pool for transmitting the discovery signal starts at an n-th subframe, the wake-up signal may be transmitted in an (n-k)-th subframe.

When a synchronization signal is transmitted in a first subframe of a discovery resource pool for transmitting the discovery signal, the wake-up signal may be transmitted through a part of a last symbol of the first subframe.

In the case of discovery where a message for informing presence of a UE is transmitted, the wake-up signal may be transmitted through a part of a last symbol of a subframe in which a synchronization signal is transmitted, and in the case of discovery where a message for searching for another UE is transmitted, the wake-up signal may be transmitted in a frequency region in which the first UE receives a signal.

The wake-up signal may be for a communication signal.

The wake-up signal may be transmitted on a last synchronization signal transmission resource before a physical sidelink control channel (PSCCH) resource pool.

A resource for transmitting the wake-up signal may be changed according to a DRX cycle.

When a PSCCH and a physical sidelink shared channel (PSSCH) are frequency division multiplexed (FDM) and then transmitted, the wake-up signal may be transmitted in a last symbol in a region in which the PSCCH is transmitted.

Advantageous Effects

According to the present disclosure, it is possible to perform a DRX operation in D2D or V2X communication while minimizing power consumption therein.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

FIG. 13 is a view illustrating the configurations of transmitting and receiving devices.

BEST MODE

Figure 1:
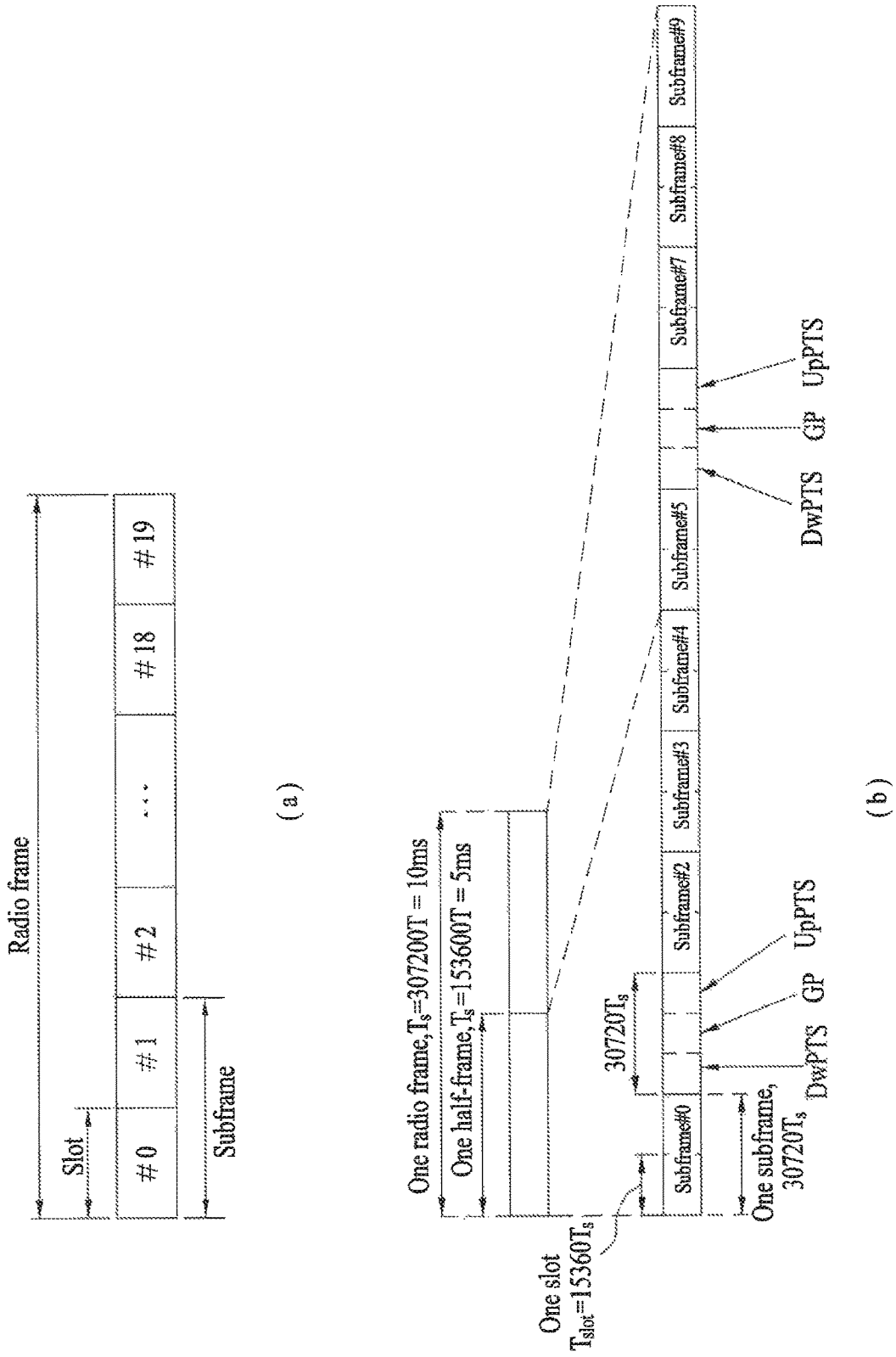
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
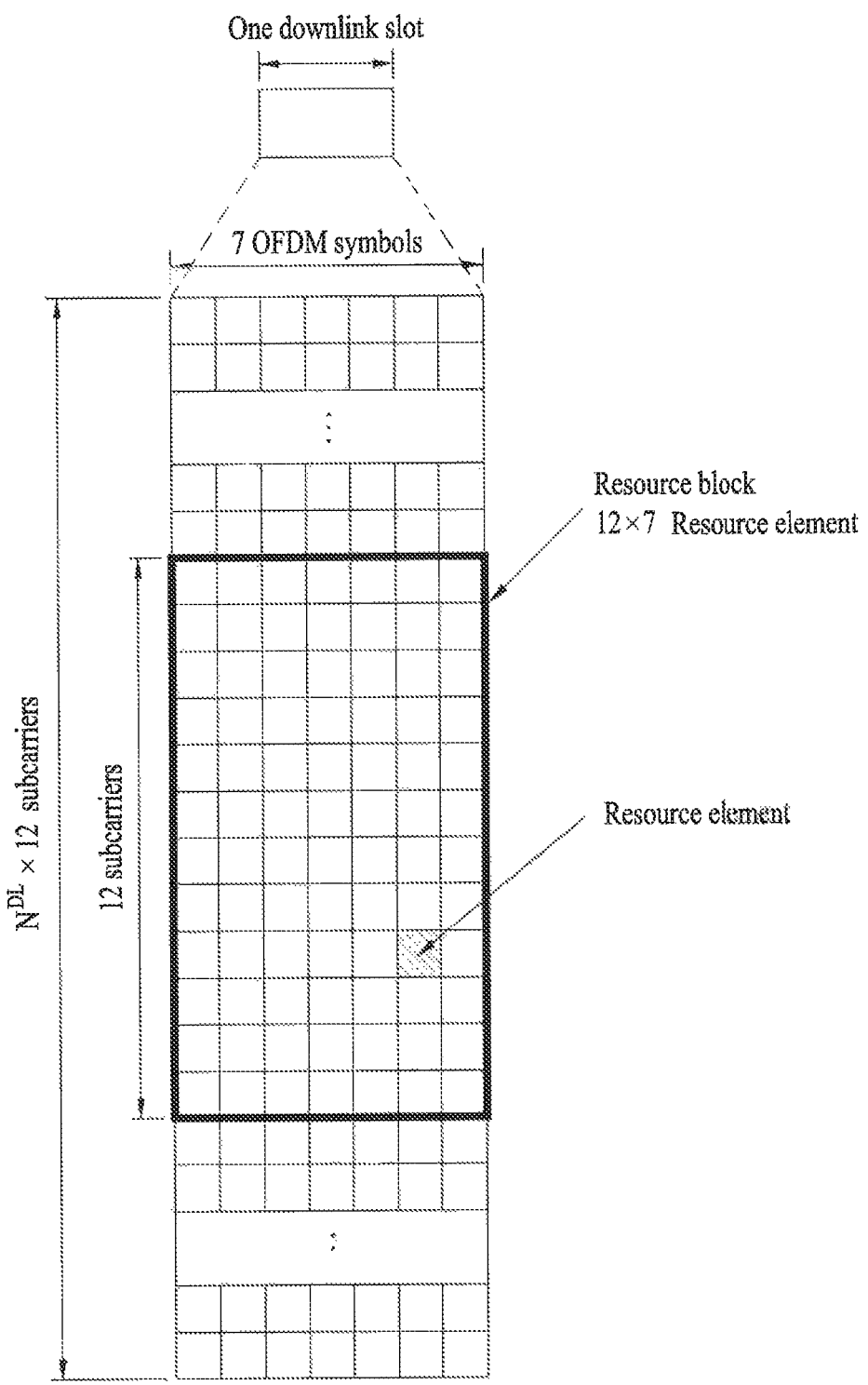
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
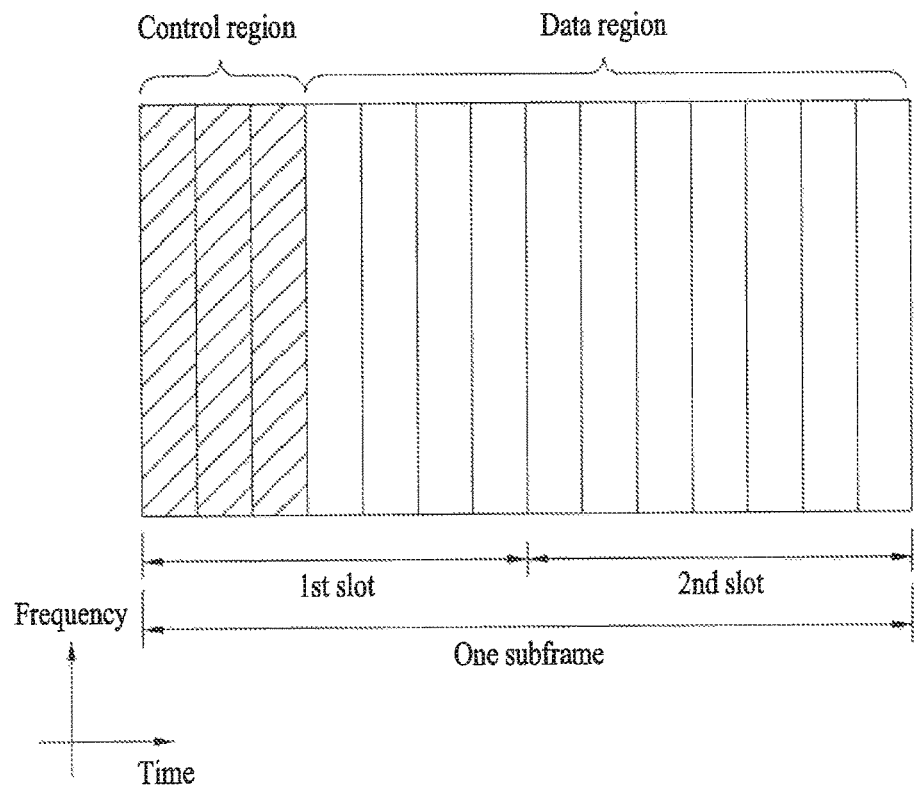
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
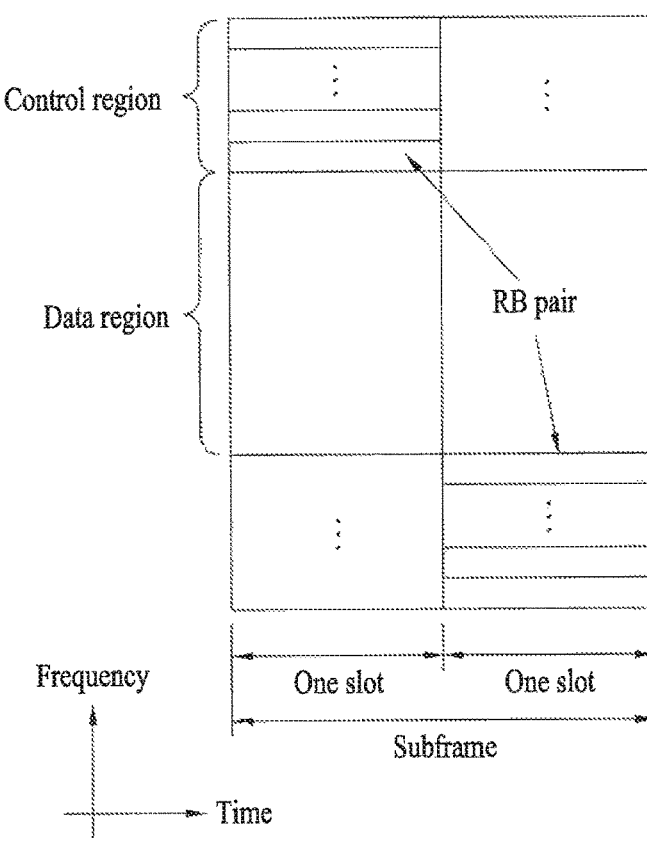
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
 i) Demodulation-reference signal (DM-RS) used for channel estimation for coherent demodulation of information delivered on a PUSCH and a PUCCH; and
 ii) Sounding reference signal (SRS) used for an eNB or a network to measure the quality of an uplink channel in a different frequency.

The downlink RSs are categorized into:
 i) Cell-specific reference signal (CRS) shared among all UEs of a cell;
 ii) UE-specific RS dedicated to a specific UE;
 iii) DM-RS used for coherent demodulation of a PDSCH when the PDSCH is transmitted;
 iv) Channel state information-reference signal (CSI-RS) carrying CSI, when downlink DM-RSs are transmitted;
 v) Multimedia broadcast single frequency network (MBSFN) RS used for coherent demodulation of a signal transmitted in MBSFN mode; and
 vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \qquad \text{Equation 6}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$ it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
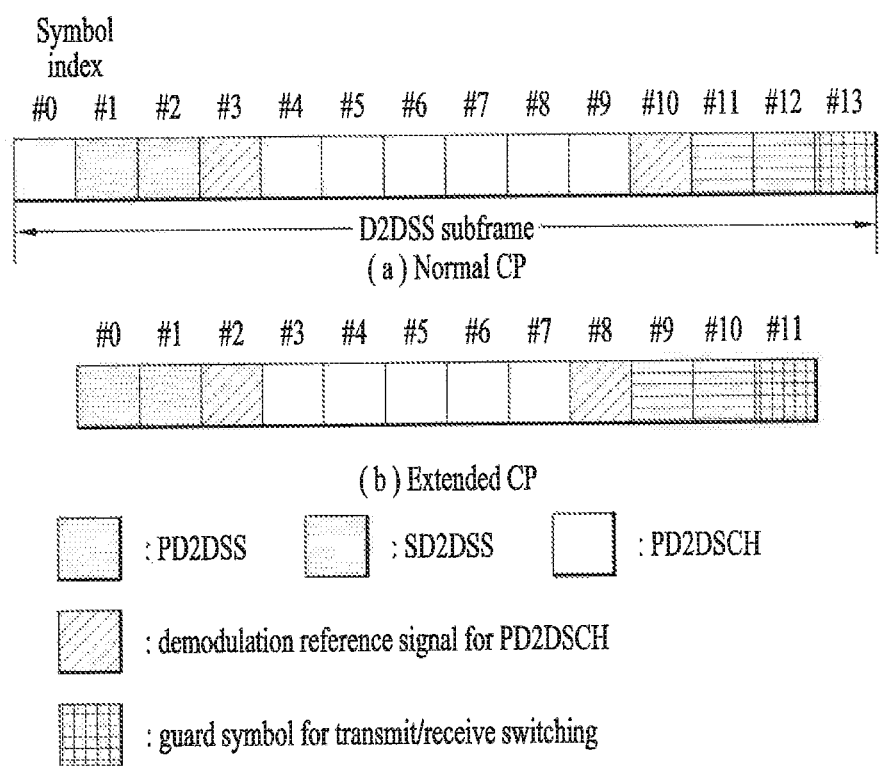
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
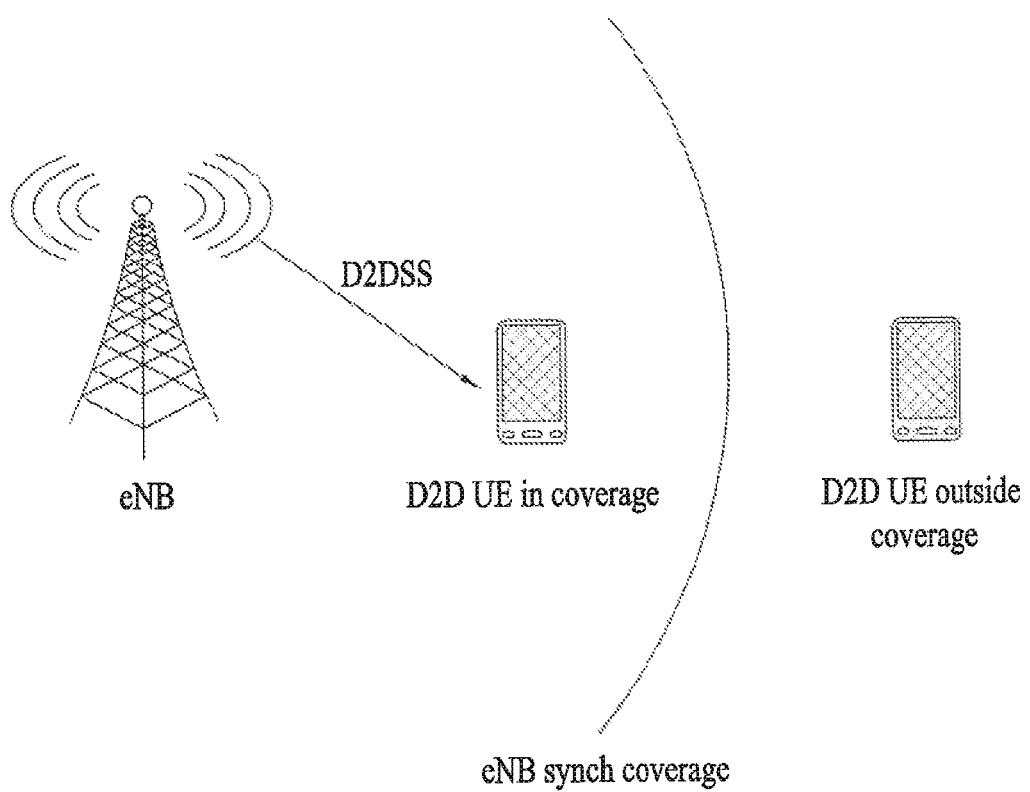
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
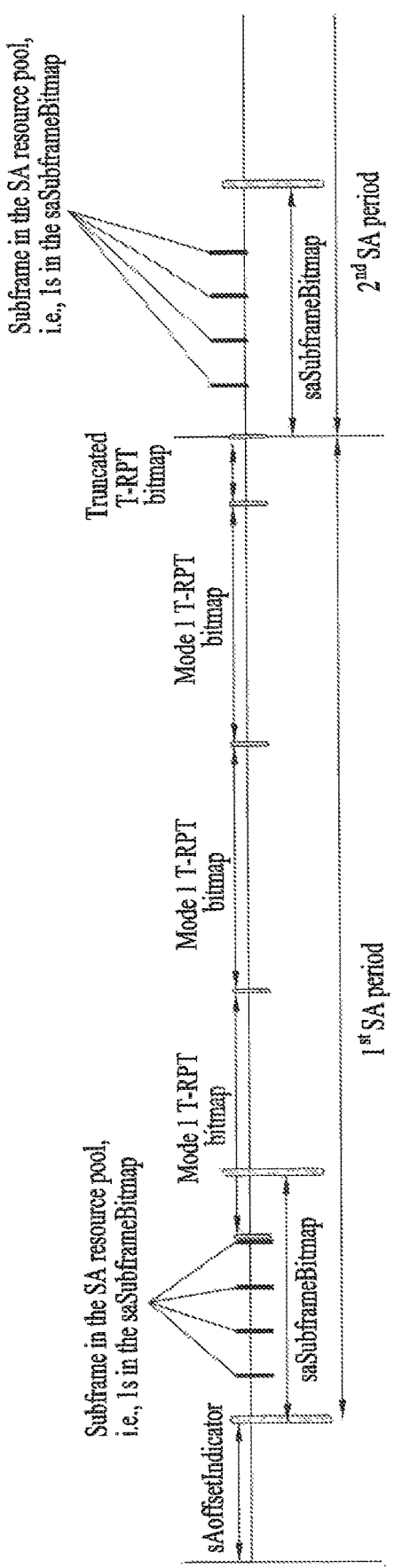
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 10:
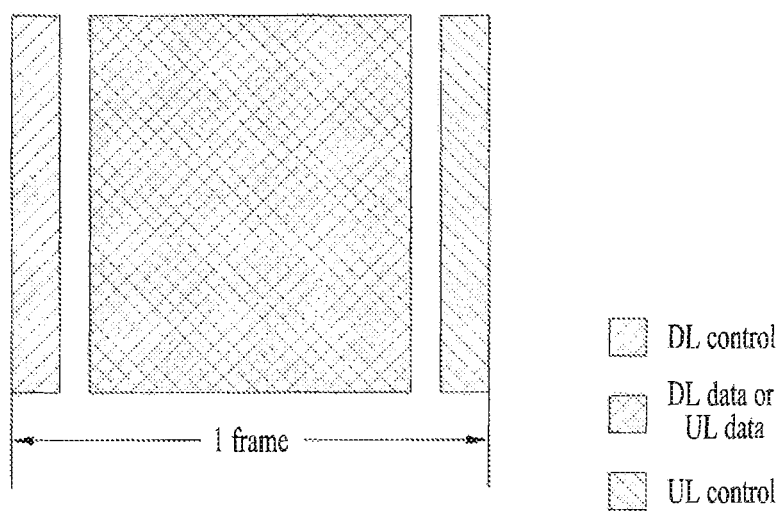
FIGS. 10 and 11 are views illustrating exemplary new radio access technology (NRAT) frame structures.
Figure 11:
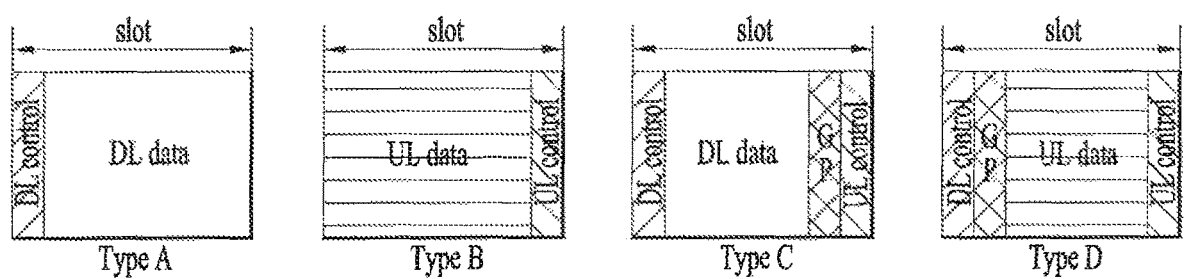

FIG. 10 illustrates an exemplary frame structure available for NR. Referring to FIG. 10, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Embodiments

Hereinafter, a description will be given of methods of transmitting and receiving a wake-up signal according to embodiments of the present disclosure. The wake-up signal means a signal for enabling a UE to determine whether there is an incoming signal and/or the type thereof by driving a simple passive circuit or a low-power circuit. Since the wake-up signal requires very low power similarly to when the UE operates in sleep mode (i.e., when the UE does not decode any signals), the power consumption thereof is much lower than that required when a control signal is decoded. In addition, the principal of the wake-up signal is different from that of conventional discontinuous reception (DRX). Specifically, in the DRX operation, a legacy UE operates in the sleep mode most of the time and checks whether there is an incoming control signal by performing PDCCH blind decoding during an ON duration period (or paging period) in a DRX cycle. Thereafter, the UE determines whether to wake up for data reception. That is, since the power consumption of the wake-up signal is much lower than that of the PDCCH blind decoding and the necessity for the PDCCH blind decoding is determined by the presence or absence of the wake-up signal, much less power may be consumed from the perspective of a receiving UE.

Hereinafter, a method of indicating whether there is a signal transmitted from another UE in D2D communication using a wake-up signal will be described. In addition, a method of indicating how a wake-up signal is transmitted and who and when the transmission period and resource location of the wake signal is indicated will be described in detail.

According to an embodiment of the present disclosure, a first UE may operate a wake-up receiver during wake-up signal ON duration, receive a wake-up signal transmitted from a second UE through the wake-up receiver, and then perform data reception. Information related to the wake-up signal ON duration may be signaled to both the first UE receiving the wake-up signal and the second UE transmitting the wake-up signal. In this case, the first UE may be a pedestrian UE (P-UE), and the second UE may be one of a vehicle UE (V-UE), a road side unit (RSU), and an eNB. In other words, the wake-up signal may be used to allow the P-UE to receive a signal from a different type of UE in V2X communication. Specifically, the P-UE turns on a wake-up signal detector during a predetermined time period. When the V-UE or eNB intends to send a message to the P-UE, the V-UE or eNB transmits the wake-up signal in order to wake up the P-UE.

Figure 12:
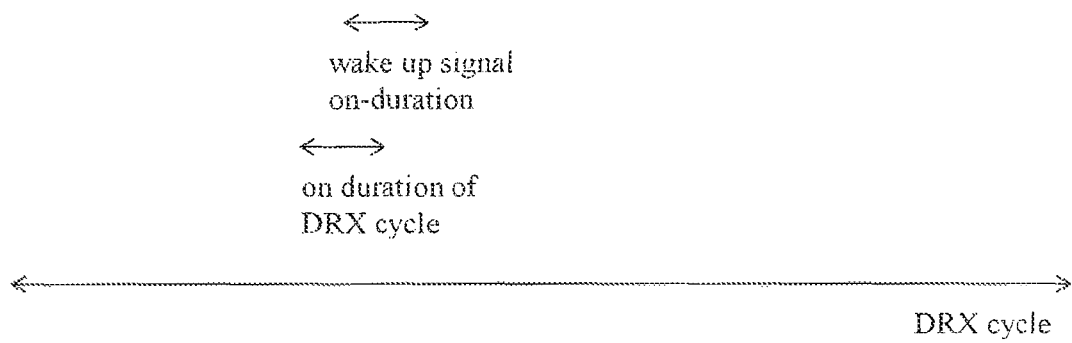
FIG. 12 is a view illustrating ON duration of a wake-up signal.

The information related to the wake-up signal ON duration may include at least one of a period, ON duration length, subframe offset, and frequency resource location. The information related to the wake-up signal ON duration and/or information related to a wake-up signal format may be signaled to the V-UE or other UEs through physical layer signaling or higher layer signaling. That is, information related to the resource for transmitting the wake-up signal and/or the wake-up signal format may be signaled not only to the UE receiving the wake-up signal but also to the UE transmitting the wake-up signal through physical layer signaling or higher layer signaling. Such signaling may be provided by a network to a UE, but it may be directly exchanged between UEs. For example, when a UE performing communication out of the network coverage establishes an initial connection, the UE may transmit some or all of its wake-up signal transmission/reception period, resource location, and wake-up signal format to another UE through physical layer signaling or higher layer signaling. The wake-up signal ON duration may overlap with the ON duration of the DRX (or connected mode discontinuous reception) cycle as shown in FIG. 12. That is, the wake-up signal ON duration may be independent from the existing DRX ON duration.

Although the above example describes that the first and second UEs are the P-UE and the V-UE, respectively, the present disclosure is not limited thereto. The first and second UEs may correspond to relay and remote UEs, respectively, as described in the following.

The wake-up signal may be separately configured for each sidelink channel or service. For example, the wake-up signal for discovery may be configured separately from that for communication.

Hereinafter, a case in which the wake-up signal is for a discovery signal will be described.

If a discovery resource pool in which the discovery signal is transmitted starts at an n-th subframe, the wake-up signal may be transmitted in an (n-k)-th subframe. The resource for transmitting the wake-up signal may be positioned before the discovery resource pool or at the first subframe of the discovery resource pool (in D2D communication). In this case, the value of k may be configured by the network or predetermined. The value of k may be more than or equal to a prescribed value to guarantee the UE's minimum processing time (for example, k may be more than or equal to 4). The frequency location of the wake-up signal may also be signaled by the network or predetermined.

Meanwhile, when a synchronization signal is transmitted in the first subframe of the discovery resource pool where the discovery signal is transmitted, the wake-up signal may be transmitted through a part of the last symbol of the first subframe. The first subframe of the discovery resource pool may be a synchronization signal transmission subframe, or the synchronization signal for transmitting and receiving the discovery signal may be transmitted in a synchronization subframe closest to the discovery resource pool. In this case, the wake-up signal may be transmitted in a partial region of the last symbol of the synchronization signal transmission subframe. For example, the wake-up signal may be transmitted in the first half region of the last symbol of the synchronization signal transmission subframe. To transmit the wake-up signal in a half of symbol duration, a sounding reference signal (SRS) type of sequence (in comb-type CAZAC sequence transmission) is mapped to the frequency domain, and a part thereof may be punctured. By doing so, it is possible to optimize the use of the existing circuit.

In the case of discovery where a UE transmits a message for informing its presence ("I'm here" message) is transmitted, the wake-up signal may be transmitted through a part of the last symbol of the synchronization signal transmission subframe. Meanwhile, in the case of discovery where the UE transmits a message for searching for another UE ("Who's here?" message), the wake-up signal may be transmitted in a frequency region used by the first UE to transmit a signal. Specifically, for D2D discovery, the following two methods may be considered: a method of transmitting the "I'm here" message (Model A); and a method of transmitting the "Who's here?" message and receiving a response message therefor (Model B). The wake-up signal may be configured differently depending on the discovery model. For example, the transmission resource region of the wake-up signal may be determined by the discovery model. In Model A, when relay and remote UEs exchange the discovery signal, both the relay and remote UEs should perform a signal search in the discovery resource pool. Meanwhile, in Model B, the discovery signal search may be performed only after the remote UE transmits the discovery signal. In other words, in Model A, since all UEs transmit the discovery signal and perform monitoring, the wake-up signal may be transmitted through a part of the last symbol of the synchronization signal transmission subframe. On the other hand, in Model B, the relay UE may transmit the wake-up signal in the frequency region where the remote UE performs reception.

In Discovery Model B, a timer or condition for monitoring the discovery resource pool may be configured to receive the response message in response to the discovery signal. That is, after transmitting the "Who's here?" message, the UE may monitor the discovery pool during a prescribed time period by operating the timer. If the UE fails to receive the response message during the prescribed time period, the UE may retransmit the discovery message until receiving the response message and/or stop monitoring of the discovery message. That is, the discovery pool monitoring operation may be stopped when the response message is received and/or when the timer expires.

In the case of the discovery between the relay and remote UEs, if the remote UE has no discovery message to transmit, the remote UE operates in the sleep mode and does not perform discovery message monitoring. If the relay UE transmits the wake-up signal in a band that can be received by the remote UE, the remote UE wakes up from the sleep mode and transmits the discovery signal. In addition, after transmitting the discovery message, the remote UE performs the discovery pool monitoring (blind decoding) during a predetermined time. The remote UE may stop this monitoring operation upon receiving the response message from the relay UE.

If the bandwidth (BW) of a transmitting UE is significantly different from that of a receiving UE (for example, if the relay UE is a normal UE and the remote UE is a low-cost UE, the BW of the remote UE where the remote UE performs access may be smaller than that of the relay UE), the transmitting and receiving UEs may have different wake-up signal bands, sequences, CSs/OCCs, and/or comb indices.

The wake-up signal may be used for communication.

In this case, the wake-up signal may be transmitted on the last synchronization signal transmission resource before a PSCCH resource pool. That is, a resource for transmitting the wake-up signal may correspond to a synchronization signal transmission resource closest to the starting point of an SA resource pool.

Alternatively, the resource for transmitting the wake-up signal for communication may be located before a control signal transmission pool (e.g., SA/PSCCH resource pool) or at a k-th subframe of the SA resource pool. When the SA resource pool appears at an n-th subframe, the transmission location of the wake-up signal may be an (n-k)-th subframe. In this case, the value of k may be signaled by the network or predetermined.

The resource for transmitting the wake-up signal may be changed depending on a DRX cycle. That is, the wake-up signal for communication may be interconnected to the DRX cycle of the UE (or UE group). For example, the location of the resource for transmitting the wake-up signal may be configured depending on the DRX cycle of a specific UE or UE group. If the ON duration of the specific UE is located at an n-th subframe, the DRX cycle of the corresponding UE may be located at an (n-k)-th subframe. In this case, the value of k and the location of the transmission resource may be signaled by the network to the UE through physical layer signaling or higher layer signaling.

When a PSCCH and a physical sidelink shared channel (PSSCH) are frequency division multiplexed (FDM) and then transmitted, the wake-up signal may be transmitted in the last symbol in a region where the PSCCH is transmitted. In this case, the wake-up signal may be a sequence type of signal. In summary, when the wake-up signal is interconnected to the DRX cycle of the specific UE, the wake-up signal may be transmitted in the last symbol in an SA resource region of the (n-k)-th subframe.

The wake-up signal may be used to indicate that transmission will be performed on another carrier. For example, when a UE receives the wake-up signal on carrier A, the UE may receive the control or discovery signal on carrier B. In this case, since the UE does not need to monitor all carriers, the UE may significantly reduce its power consumption. To this end, the wake-up signal may be UE-specific and/or carrier-specific. For example, if the wake-up signal is formed in the form of a sequence, at least one of the ID/CS/OCC and the payload of the wake-up signal may be configured differently depending on UEs (or UE groups) and/or (indicated) carriers.

Hereinafter, various methods for configuring a resource for transmitting a wake-up signal will be described. The following resource configuration methods may be combined with the above-described methods of configuring the resource location/region at/in which the wake-up signal is transmitted unless they collide with each other.

In D2D communication, the transmission period and transmission resource location of the wake-up signal may be signaled by the network or predetermined. The eNB may provide to the UE information about at least one of the time, resource, period, signal, and UE related to wake-up signal transmission and reception through physical layer signaling or higher layer signaling. This wake-up signal may be indicated separately from the wake-up signal for a Uu link.

The wake-up signal for the Uu link may be different from that for a sidelink in terms of at least one of the signal structure, transmission period, transmission (time and/or frequency) resource location, sequence index, sequence ID, sequence cyclic shift (CS), orthogonal cover code (OCC), comb index, comb repetition factor, and payload (in the case of a codeword).

The network may signal to the UE the resource for transmitting the wake-up signal for each cell and/or resource pool through physical layer signaling or higher layer signaling.

The network may configure some parameters of the wake-up signal, for example, the resource location, period, property, etc., and the UE may determine the remaining parameters. For example, the network may configure only the transmission resource location and period of the wake-up signal, and a UE intending to transmit data may determine other parameters such as the wake-up signal transmission UE, transmitted signal type, transmission sequence, payload information, CS/OCC, ID, etc. When some properties of the wake-up signal are determined by the UE as described above, the determined parameters may be UE-specific or UE-group-specific. That is, the properties determined by the UE may use different parameters depending on transmitting UEs, receiving UEs, or UE groups. For example, in sidelink communication, the wake-up signal may be used to wake up a specific receiving UE or a specific receiving UE group, and in this case, the sequence ID of the wake-up signal may be interconnected to the UE ID of the receiving UE. Alternatively, to indicate which transmitting UE transmits the wake-up signal, some properties of the wake-up signal may be determined based on the UE ID of the transmitting UE.

In the proposed methods, it may be indicated that the wake-up signal is transmitted in a (predetermined or signaled) region rather than a specific subframe. For example, if it is indicated that the wake-up signal is transmitted in subframes [n-k1, n-k2], the UE may search for the wake-up signal in the corresponding region. If the UE operates in the sleep mode for a long time, it is difficult for the UE to accurately recognize a subframe location due to clock drift.

When the wake-up signal is placed in the middle of an SC or a discovery period, the corresponding wake-up signal may be used to indicate monitoring in a next SC or discovery period.

To reduce the number of UEs that fail to receive the wake-up signal, the coverage of the wake-up signal may be extended. To this end, the wake-up signal may be transmitted repeatedly in a certain time region, instead of being transmitted in one subframe. For example, if the control signal is transmitted in an n-th subframe, the wake-up signal may be repeatedly transmitted in subframes [n-k1, n-k2].

The wake-up signal may be formed in the form of 'sequence+payload' or 'sequence only'. In this case, a field in the payload or a parameter in the sequence may contain information indicating when the UE should wake up to receive the control, discovery, or data signal after receiving the wake-up signal. For example, when the CS and time offset of the sequence are mapped according to a predetermined rule, the receiving UE may determine when it should wake up to perform reception after successfully detecting the wake-up signal.

The wake-up signal may be configured Tx-UE-specifically, Rx-UE-specifically, UE-group-specifically and/or service-specifically. Alternatively, these properties may be combined to create a specific type of signal. For example, at least one of the signal structure, transmission period, transmission (time and/or frequency) resource location, sequence index, sequence ID, sequence CS, OCC, comb index, comb repetition factor, and payload (in the case of a codeword) may be changed according to a specific property. In this case, some properties of the wake-up signal may be deduced from the properties of the UE. For example, the sequence ID of the wake-up signal or some fields in the payload may be configured based on the UE ID of the receiving UE. If the sequence of the wake-up signal is configured differently for each receiving UE, a large number of sequences are required so that the complexity of the receiving UE may increase. To solve this problem, the wake-up signal may be configured based on a certain value (for example, a hashing function) derived from the UE ID, instead of being directly configured based on the UE ID. In this case, since some UEs may create the same wake-up signal if the hashing function is fixed at all times, such a derived function may be changed depending on time.

Meanwhile, although the sequence of the wake-up signal is identified by the property of the UE, the wake-up signal from a specific UE may not be received due to the near-far effect if different UEs transmit their wake-up signals on the same time-frequency resources. To solve this problem, the present disclosure proposes that each UE transmits the wake-up signal by selecting multiple different time-frequency resources in a certain time region. For example, assuming that four time resources are configured for wake-up signal transmission and reception, UE 1 may transmit the wake-up signal in resources 1 and 3, and UE 2 may transmit the wake-up signal in resources 2 and 3. In this case, although the UEs simultaneously use resource 3, the UEs also use different resources for the transmission. Thus, if there is a UE that fails to perform reception on resource 3, the UE may perform the reception on the different resources. The above transmission resource pattern may be autonomously determined by the UE or indicated by the network. Alternatively, the transmission resource pattern may be changed according to the ID of the transmitting (or receiving) UE, the transmission packet type, or the service type.

The wake-up signal may be used as a go-to-sleep signal by maintaining/changing some properties thereof. The network may inform the UE of the resource location, period, etc. of the sidelink go-to-sleep signal or predetermine them. If the UE has no data to transmit, the UE may transmit the go-to-sleep signal immediately (or the UE may operate a timer during a predetermined time and then transmit the go-to-sleep signal after expiration of the timer). By doing so, a receiver may enter the sleep mode. For example, it is assumed that a UE is transmitting data to another UE that wakes up by receiving the wake-up signal during ON duration. If the UE has no more data to transmit, the UE may transmit the go-to-sleep signal. Then, the receiver may switch to the sleep mode, maintain the sleep mode until a next DRX cycle, and then search for the wake-up signal during the ON duration of the next cycle. If no wake-up signal is detected, the receiver may maintain the sleep mode.

The present disclosure is not limited to D2D communication. That is, the disclosure may be used for uplink or downlink communication, and in this case, the proposed methods may be used by an eNB, a relay node, etc.

Since each of the examples of the proposed methods may be included as one method for implementing the present disclosure, it is apparent that each example can be regarded as a proposed method. In addition, although the proposed methods may be implemented independently, some of the proposed methods may be combined (or merged) for implementation. Moreover, it may be regulated that information related to whether the proposed methods are applied (or information related to rules related to the proposed methods) should be transmitted from the eNB to the UE through a predefined signal (e.g., a physical layer signal, a higher layer signal, etc.). Alternatively, it may be regulated that the transmitting UE signals the information to the receiving UE or the receiving UE requests the transmitting UE to transmit the information.

For example, when a specific MCS or modulation order is used, the network may signal to the UE whether PSCCH power boosting is performed through physical layer signaling or higher layer signaling. The signaling may be configured separately for each resource region or applied to all UEs participating D2D communication. If 64-QAM is used, the network may signal to the UE whether a PSCCH power offset is applied through higher layer signaling or preconfigure whether the PSCCH power offset is applied.

Device Configurations According to Embodiments of the Present Disclosure

FIG. 13 is a diagram illustrating the configurations of a transmission point device and a UE device according to embodiments of the present disclosure.

Referring to FIG. 13, the transmission point device 10 may include a reception device 11, a transmission device 12, a processor 13, a memory 14, and a plurality of antennas 15. The plurality of antennas 15 may mean that the transmission point device 10 supports multiple-input multiple-output (MIMO) transmission and reception. The reception device 11 may be configured to receive various signals, data, and information from the UE in uplink. The transmission device 12 may be configured to transmit various signals, data, and information to the UE in downlink. The processor 13 may be configured to control overall operations of the transmission point device 10.

The processor 13 of the transmission point device 10 according to an embodiment of the present disclosure may be configured to perform the operations required for the above-described embodiments.

In addition, the processor 13 of the transmission point device 10 may be configured to perform functions of processing information received by the transmission point device 10 or information to be transmitted by the transmission point device 10. The memory 14 may be configured to store the processed information during a prescribed time period, and it may be replaced with a component such as a buffer (not shown in the drawing).

Referring again to FIG. 13, the UE device 20 may include a reception device 21, a transmission device 22, a processor 23, a memory 24, and a plurality of antennas 25. The plurality of antennas 25 may mean that the UE device 20 supports MIMO transmission and reception. The reception device 21 may be configured to receive various signals, data, and information from the eNB in downlink. The transmission device 22 may be configured to transmit various signals, data, and information to the eNB in uplink. The processor 23 may be configured to control overall operations of the UE device 20.

The processor 23 of the UE device 20 according to an embodiment of the present disclosure may be configured to perform the operations required for the above-described embodiments. Specifically, the processor may be configured to operate a wake-up receiver during wake-up signal ON duration and receive data after receiving a wake-up signal transmitted from a second UE through the wake-up receiver. Information related to the wake-up signal ON duration may be signaled to both a first UE receiving the wake-up signal and the second UE transmitting the wake-up signal.

In addition, the processor 23 of the UE device 20 may be configured to perform functions of processing information received by the UE device 20 or information to be transmitted by the UE device 20. The memory 24 may be configured to store the processed information during a prescribed time period, and it may be replaced with a component such as a buffer (not shown in the drawing).

The transmission point device 10 and the UE device 20 may be implemented such that the above-described embodiments of the present disclosure are independently implemented or two or more embodiments are simultaneously implemented. Here, redundant descriptions are omitted for clarity.

The details of the transmission point device 10 in FIG. 13 may be equally applied to a relay device operating as a downlink transmission entity or an uplink reception entity, and the details of the UE device 20 in FIG. 13 may be equally applied to a relay device operating as a downlink reception entity or an uplink transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. Method of receiving a signal by a first user equipment (UE) in a wireless communication system, the method comprising:
   entering, by the first UE, an on duration of a sidelink DRX (Discontinuous Reception); and
   receiving, by the first UE, a signal from a second UE within the on duration; and,
   wherein a start of the on duration of the sidelink DRX is determined based on an ID of the first UE and based on the first UE being a destination of the signal.

2. The method of claim 1, wherein the parameter corresponds to an information informing the first UE of a time location of the on duration.

3. The method of claim 1, wherein the first UE is one UE in a plurality of groupcast UEs.

4. The method of claim 1, wherein at least one of a resource related to the signal or period is indicated by a network.

5. The method of claim 1, wherein the signal is transmitted received periodically from the second UE.

6. The method of claim 1, wherein the first UE communicates with at least one of another UE, a UE related to autonomous driving vehicle, a BS, or a network.

7. A User Equipment (UE) device comprising:
   at least one processor; and
   at least one computer memory operatively coupled to the at least one processor and storing instructions which, when executed, cause the at least one processor to perform operations including:
   entering an on duration of a sidelink DRX (Discontinuous reception); and
   receiving a signal from a second UE within the on duration; and,
   wherein a start of the on duration of the sidelink DRX is determined based on an ID of the first UE and based on the first UE being a destination of the signal.

8. A processor for transmitting a Physical Sidelink Shared Channel (PSSCH) in a wireless communication system, the processor perform performing operations for a user equipment (UE), wherein the operations include:
   entering an on duration of a sidelink DRX (Discontinuous reception); and
   receiving a signal from a second UE within the on duration; and,
   wherein a start of the on duration of the sidelink DRX is determined based on an ID of the first UE and based on the first UE being a destination of the signal.

9. A non-transitory computer-readable storage medium storing at least one computer program including instructions which, when executed by at least one processor, cause the at least one processor to perform operations for a first user equipment (UE), wherein the operations include:
   entering an on duration of a sidelink DRX (Discontinuous reception); and
   receiving a signal from a second UE within the on duration; and,
   wherein a start of the on duration of the sidelink DRX is determined based on an ID of the first UE and based on the first UE being a destination of the signal.

* * * * *